(12) United States Patent
Bech

(10) Patent No.: US 7,081,048 B2
(45) Date of Patent: Jul. 25, 2006

(54) APPARATUS AND A METHOD FOR SKINNING FISH

(76) Inventor: Jörgin Bech, 480 Skala, Faroe Islands (DK) 001444

( * ) Notice: Subject to any disclaimer, the term of this patent is extended or adjusted under 35 U.S.C. 154(b) by 0 days.

(21) Appl. No.: 10/467,367

(22) PCT Filed: Feb. 7, 2002

(86) PCT No.: PCT/DK02/00086

§ 371 (c)(1),
(2), (4) Date: Jan. 20, 2004

(87) PCT Pub. No.: WO02/062150

PCT Pub. Date: Aug. 15, 2002

(65) Prior Publication Data

US 2004/0116062 A1    Jun. 17, 2004

(30) Foreign Application Priority Data

Feb. 7, 2001    (DK) ............... 2001 00197

(51) Int. Cl.
*A22C 25/16*    (2006.01)

(52) U.S. Cl. ..................... 452/161

(58) Field of Classification Search ............... 452/149, 452/151–155, 161–163
See application file for complete search history.

(56) References Cited

U.S. PATENT DOCUMENTS

| | | | |
|---|---|---|---|
| 1,701,667 A | * | 2/1929 | English et al. ............. 452/99 |
| 1,901,625 A | * | 3/1933 | Birdseye ..................... 452/99 |
| 2,702,922 A | * | 3/1955 | Thibodeau .................. 452/99 |
| 3,084,379 A | * | 4/1963 | Henning ...................... 452/5 |
| 3,892,010 A | | 7/1975 | Bartels et al. |
| 4,642,085 A | * | 2/1987 | Helm ......................... 493/222 |
| 4,748,724 A | * | 6/1988 | Lapeyre et al. ............ 452/158 |
| 4,928,352 A | * | 5/1990 | Thibodeaux .................. 452/1 |
| 5,476,417 A | * | 12/1995 | Long et al. ................. 452/127 |
| 5,810,652 A | | 9/1998 | Eide et al. |

FOREIGN PATENT DOCUMENTS

| | | |
|---|---|---|
| DE | 2 343 795 | 3/1974 |
| EP | 0 463 701 B1 | 1/1992 |
| NO | 133686 B | 3/1976 |

* cited by examiner

*Primary Examiner*—Thomas Price
(74) *Attorney, Agent, or Firm*—Browdy and Neimark, PLLC

(57) ABSTRACT

A method for skinning a piece of fish using a supporting surface (1) for a piece of fish (13) and a knife (10) with an active portion (11) for separation of the skin (15) from the fish meat by a mutual movement of the supporting surface (1) and an active portion (11) of the knife in relation to each other in a direction of feed, where the supporting surface (1) has a profile by which the distance between the active portion (11) of the knife and the supporting surface (1) varies across the direction of feed. The supporting surface being a conveyor belt (1), and a portion of the supporting surface at the active portion (11) of the knife being constituted by the running belt (1) of the conveyor and by an adjustable support (6) arranged under the belt and having an adjustable profile across the direction of feed.

3 Claims, 5 Drawing Sheets

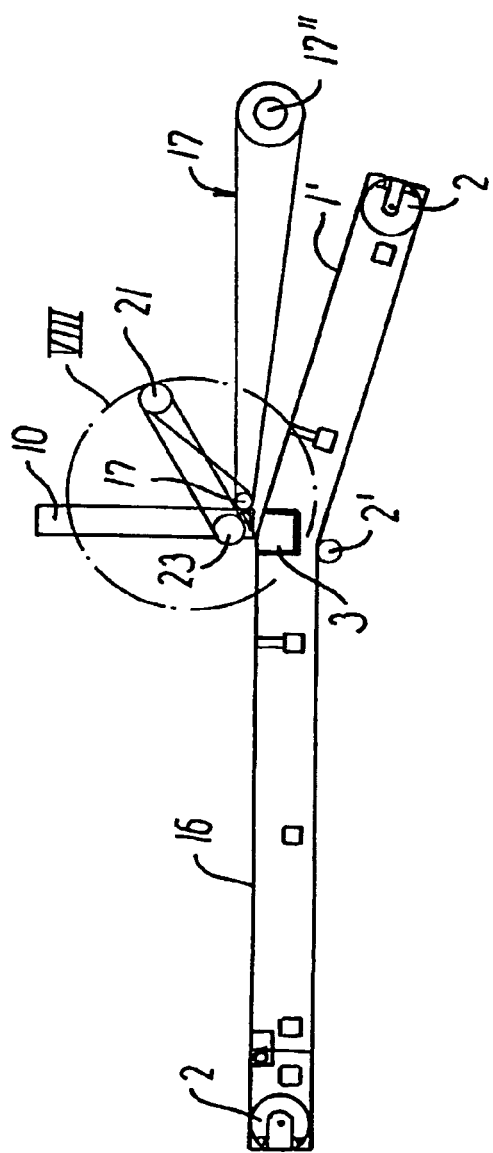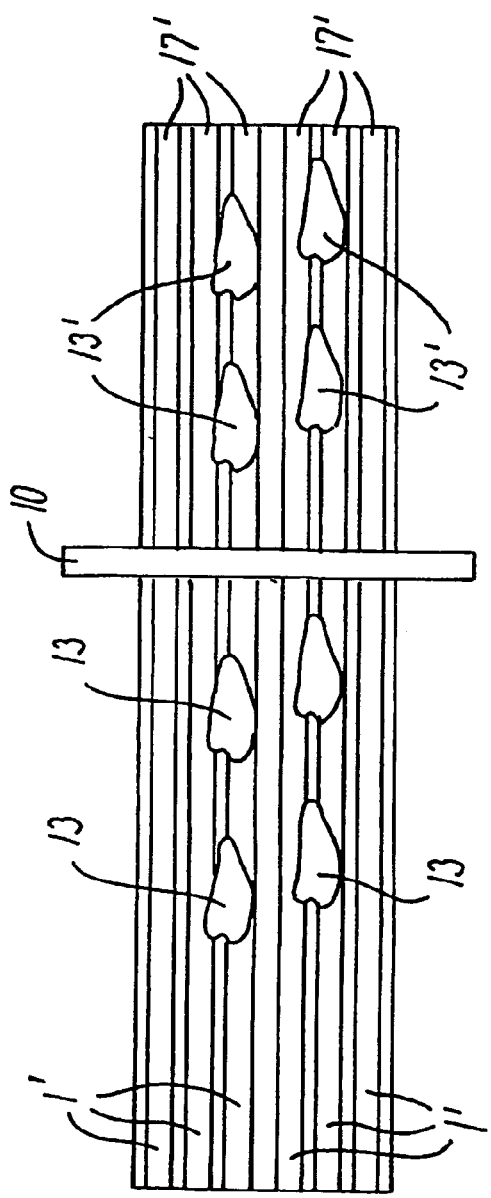
FIG. 6
FIG. 7

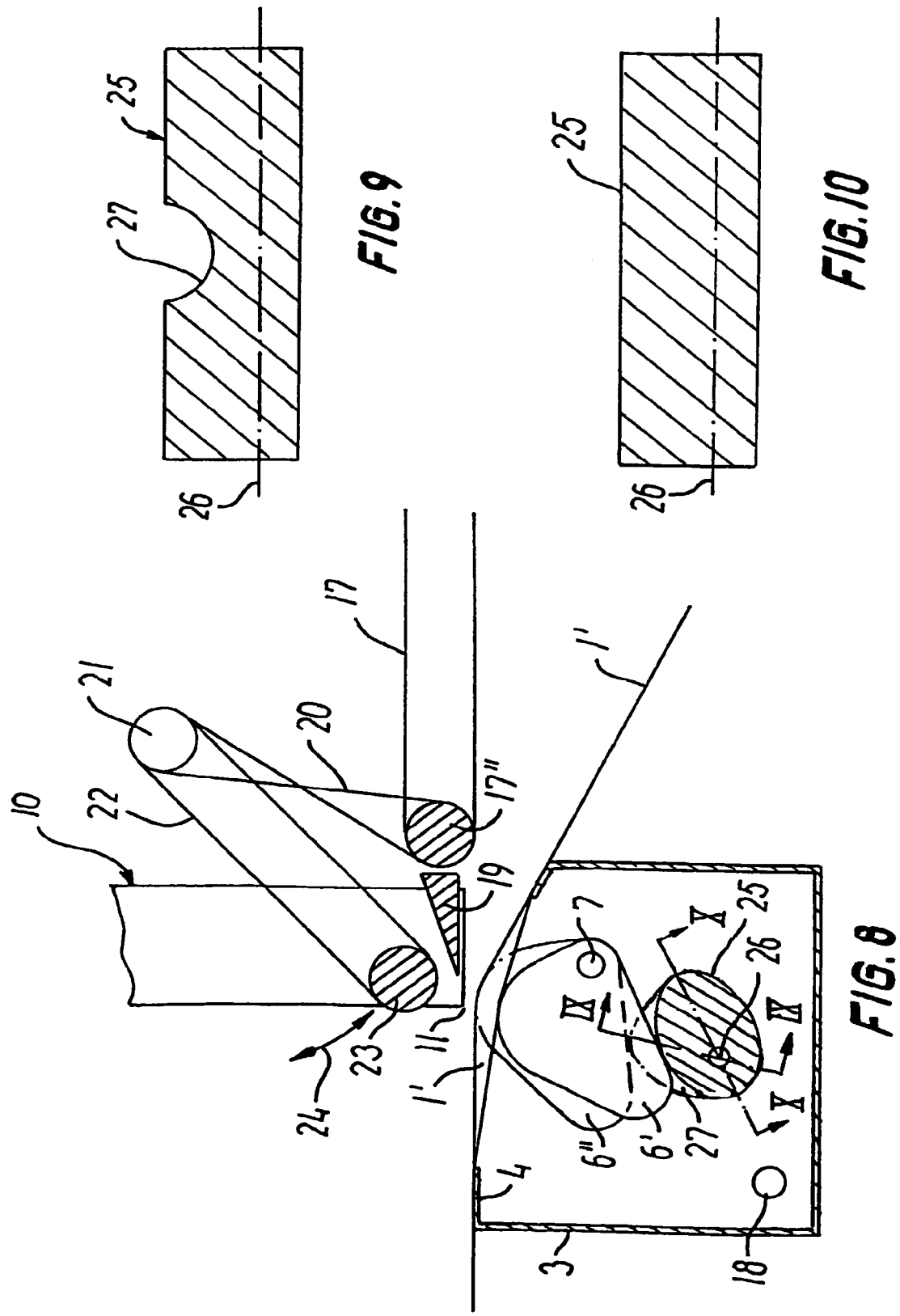

APPARATUS AND A METHOD FOR SKINNING FISH

BACKGROUND OF THE INVENTION

Technical Field of the Invention

The invention concerns an apparatus for skinning fish comprising a supporting surface for fish, in particular fish fillets, and a knife with an active portion for separation of the skin and the fish meat by a mutual movement of the supporting surface and the active portion of the knife in relation to each other in a direction of feed, where the supporting surface has a profile by which the distance between the active portion of the knife and the supporting surface varies across the direction of feed. Furthermore, the invention relates to a method for skinning a fish, in particular a fish fillet, where the fish is placed on a supporting surface and retained against this, and the fish thus retained is conveyed relatively in a direction of feed towards a knife separating the major part of the fish meat from the skin.

Prior Art

U.S. Pat. No. 5,810,652 discloses a known apparatus of the above kind, where the knife has a fixed, adjustable distance from the supporting surface and thus cut off a fixed, predetermined thickness of skin and perhaps a little of the adjacent meat. The supporting surface is constituted by a drum with a fixed profile across the direction of feed in the form of a circular track in the shell face of the drum, and a press roll is provided to press the fillet down into the track such that fat under the skin is cut off with the skin by means of a band knife.

NO-B-133 686 discloses an apparatus for cutting off the skin from fish fillets by means of a circular cutter. In order to cut off the skin in a uniform thickness in spite of the round periphery of the knife, an hourglass-shaped roller with a perforated shell face is used as an abutment and the fillets are sucked to rest on the roll.

Some fish, for instance saithe, are along their side provided with a layer of fat and/or a fat muscle, the thickness and profile of which vary along the fish. It is desired to cut off this fat.

OBJECT AND SUMMARY OF THE INVENTION

The object of the present invention is to permit such a cutting.

According to the invention, this is achieved by means of an apparatus of the initially stated kind which is characterized in that the supporting surface comprises a belt conveyor, and that a portion of the supporting surface at the active portion of the knife is constituted by the running belt of the conveyor and by an adjustable support arranged under the belt and having an adjustable profile across the direction of feed. By retaining the fillet against the supporting surface during the cutting, a corresponding profile is cut off in the fish meat, and this profile may easily be adjusted to satisfy the actual need.

In a preferred embodiment, the adjustable support comprises lifting and lowering elements being juxtaposed across the direction of feed to provide said profile.

Preferably, a cam cylinder is provided to produce the adjustable profile, and in the preferred embodiment, the cam cylinder acts on the elements to lift or lower them.

In an alternative embodiment, the cam cylinder can directly form the adjustable support, the adjustment being then effected by rotation of the cam cylinder, in order to turn a circumferential part with a desired profile forward in a position to support the belt.

In a second embodiment, cylinders are provided to control the up and down movements of the elements.

It is foreseen that the adjustment of the profile is controlled depending on the position of a fish in relation to the active portion of the knife. This requires a continuous determination of the placement of the fish in relation to the active portion of the knife, which can be provided in any known manner.

To assure that the fish is retained against the supporting surface and thus follows the profile, the supporting surface is in a preferred embodiment air permeable and under the supporting surface at the active portion of the knife, means are provided to produce a vacuum.

Said means may comprise a chamber arranged under the supporting surface and with a connection for a vacuum source. The chamber is preferably closed to the surroundings, except for a wall, preferably the ceiling formed by the supporting surface of the conveyor or a portion hereof.

In a preferred embodiment, a rotational press roll is provided with an axis of rotation perpendicular to the direction of feed and arranged above the active portion of the knife. The press roll is preferably driven. Such a press roll can as an alternative or a supplement to vacuum retain the fish against the supporting surface at the active portion of the knife. A driven press roll can furthermore contribute to assuring the feed of the fish in relation to the active portion of the knife.

Preferably, a second conveyor is positioned after the active portion of the knife and above the first belt conveyor, and preferably, a guide element is placed above the active portion of the knife and upstream to the second conveyor. Thus, after the cutting of the skin, the fish can be guided through another path than the skin for further treatment.

The method according to the invention is characterized in that a recess in the supporting surface can be adjusted as desired, such that a varying cutting profile is provided across the direction of feed, larger or smaller quantities of meat being cut across the fillet with the skin.

Said profile might be modified during the skinning.

BRIEF DESCRIPTION OF THE DRAWINGS

The used knife is preferably a band knife.

In the following, the invention will be explained in more detail by means of embodiment examples with reference to the schematic drawing, on which FIG. 10 is a section along the line X—X through a cam cylinder in FIG. 6.

DETAILED DESCRIPTION OF THE PREFERRED EMBODIMENTS OF THE INVENTION

Figure 1:
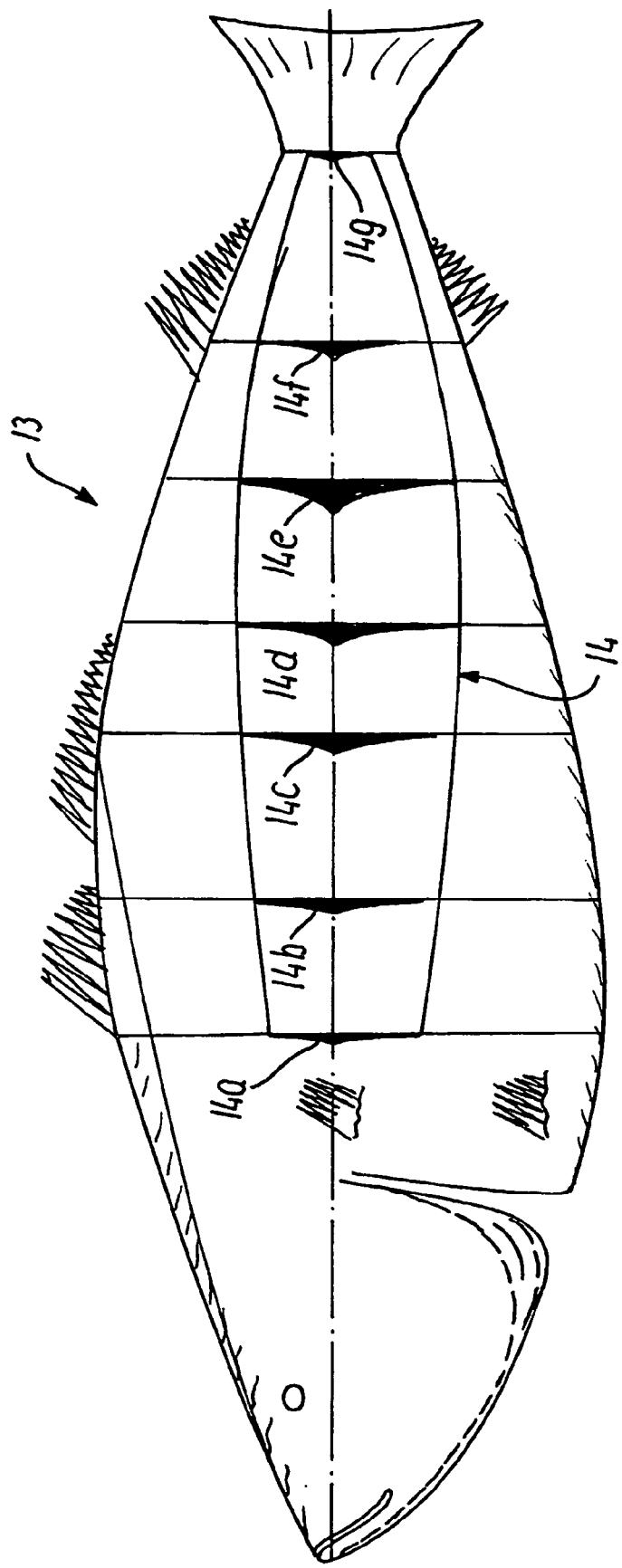
FIG. 1 shows a saithe with indication of dimension and profile of the fat layer along the side, FIG. 2 a longitudinal section through an apparatus according to the invention, FIG. 3 a cross section through the apparatus in FIG. 2 showing the cut in a fish fillet, FIG. 4 a segment of a cross section through the apparatus in FIG. 2, but with another adjustment than in FIG. 3.
Figure 2:
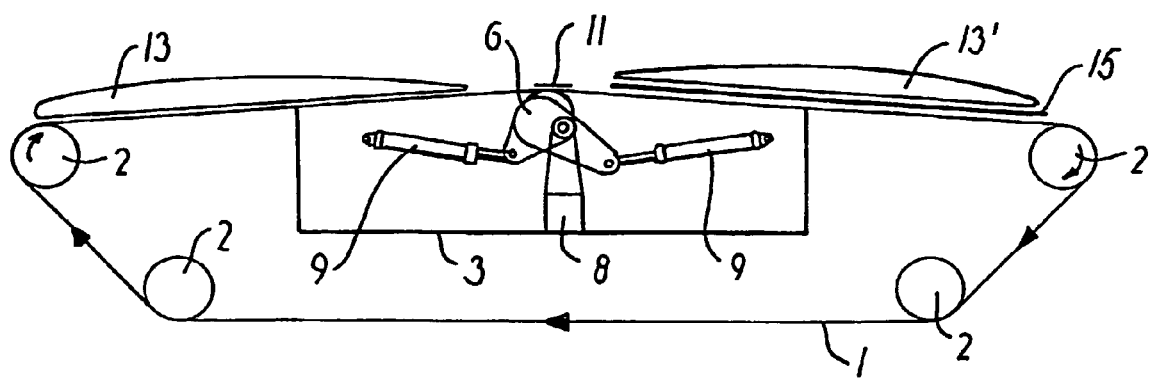

The apparatus comprises a conveyor belt 1 being guided over rolls 2, of which at least one is driven, across the top side of a box 3 the interior of which is connected to a not-shown vacuum source to provide a vacuum in the box 3. The ceiling 4 of the box 3 is provided with an opening 5, at which a number of elements 6 are placed to move up and down. The box ceiling 4, at least in the area around the opening 5, and the conveyor belt 1 are perforated such that air can be sucked through them.

Figure 5:
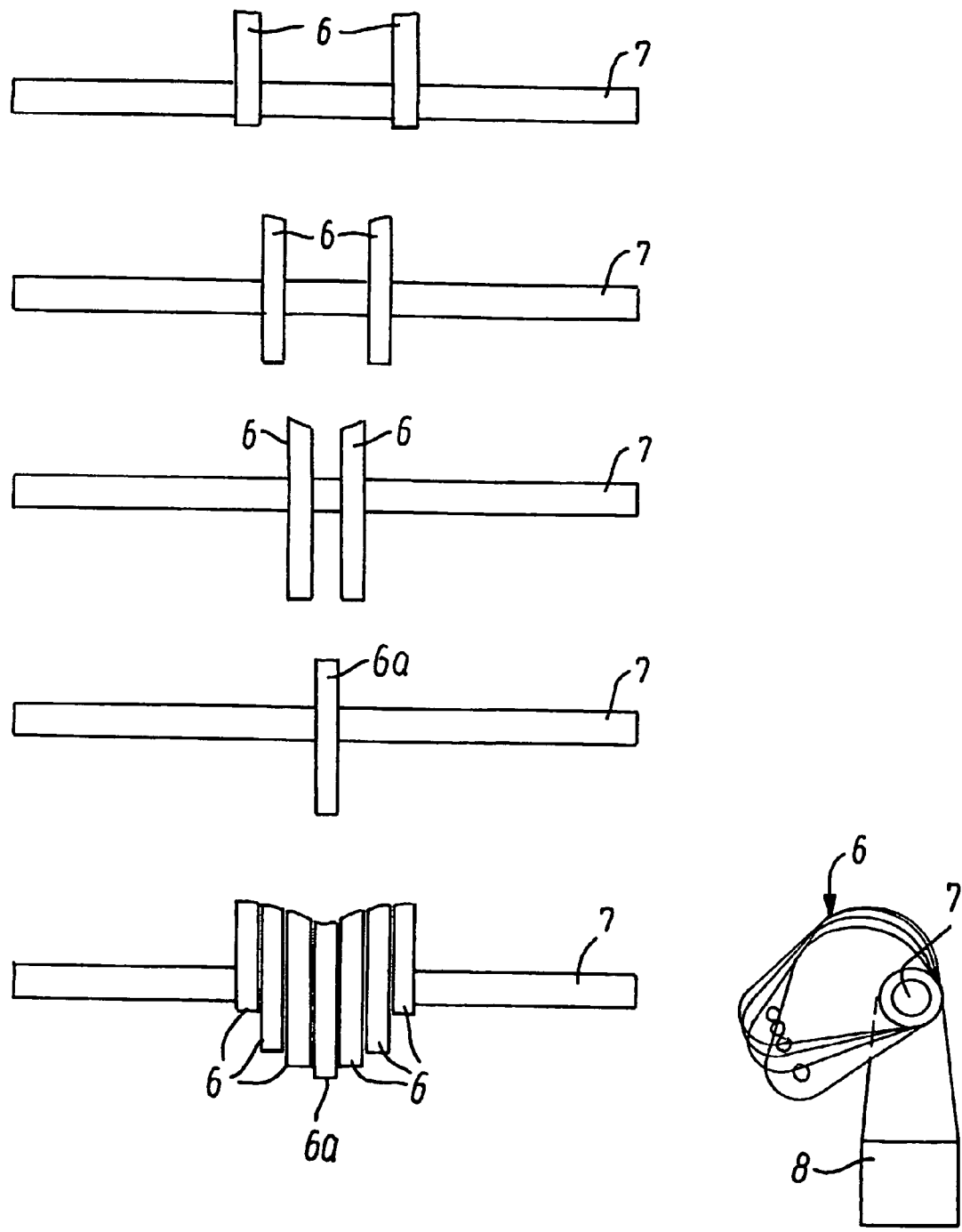
FIG. 5 illustrates the profile adjustment, FIG. 6 a longitudinal section through a preferred, further developed embodiment of an apparatus according to the invention, FIG. 7 a view of the apparatus in FIG. 6 seen from above, some parts being removed, FIG. 8 an enlarged section of FIG. 6, FIG. 9 a section along the line IX—IX through a cam cylinder in FIG. 6.

The elements 6 can be drop-shaped as shown in FIG. 5 and hinged to a shaft 7 such that they can be turned up and down as also shown in FIG. 5. FIG. 5 thus shows, each separate and together, the total 7 elements 6 used in the example and arranged in pairs around a centre element 6a. Together the elements are seen from in front and from the side. The shaft 7 is carried by a pillar 8, and the movement of the elements 6 up and down can be effected by means of cylinders 9 in the box.

A knife 10 placed over the opening 5 and the elements 6 is in the example a band knife with a band-shaped blade 11 driven over rolls 12 as shown by arrows on the rolls and on the blade 11. The distance between the lower course of the blade 11 and the ceiling 4 of the box 3 is adjustable and thus, also the general cutting thickness.

Figure 3:
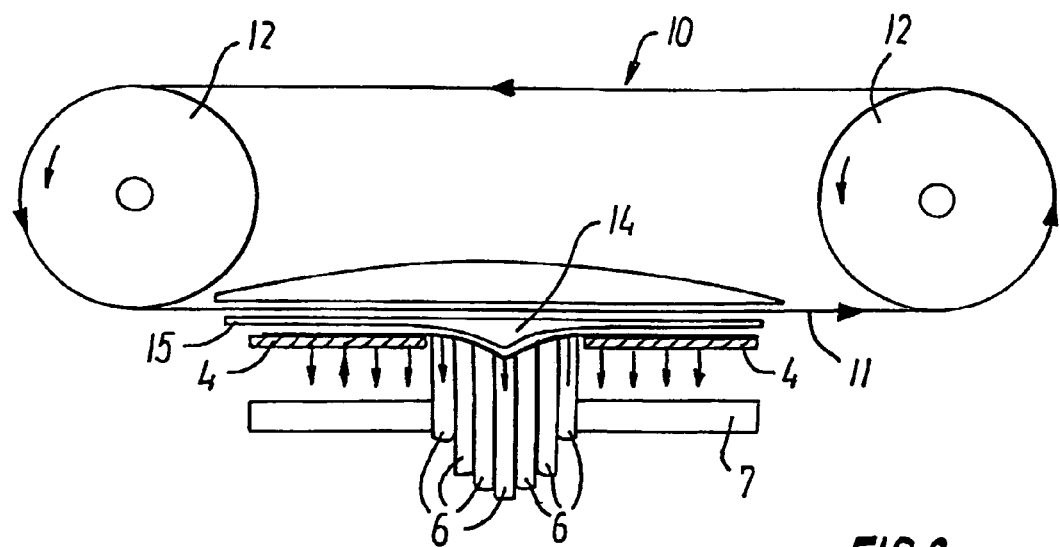
Figure 4:
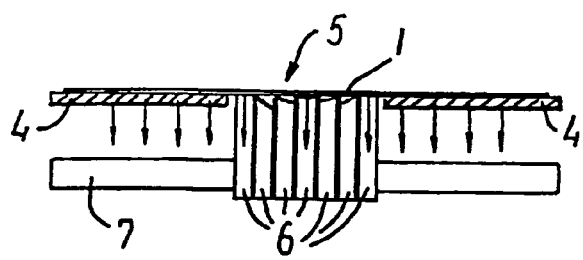

A saithe 13 as shown in FIG. 1 has along its side under the skin a dark, fat layer 14, the thickness and profile of which 14a–14g are shown. By means of the apparatus according to the invention, this layer 14 can be cut off with the skin 15 in that the elements 6 as shown in FIG. 3 are adjusted to form a profile corresponding to that of the layer 14, and a fillet of the saithe 13 is guided past the knife blade 11 while the vacuum in the box 3 assures the retaining of the skin down to the ceiling 4 of the box 3 such that the side of the fish assumes the profile formed by the elements 6 and ceiling 4.

The fillet is thus formed by vacuum during cutting such that only the undesired, dark, fat layer is cut away from the desired light meat. Means are intended to be used for automatic control of the positions of the elements 6 during the cutting in order to change the profile and cutting depth along the side of the fish.

FIGS. 6–10 show a further developed, preferred embodiment of the apparatus according to the invention.

FIGS. 6 and 7 thus show a first conveyor 16 for feed of fish of fillets 13 with skin to the knife 10. This conveyor 16 comprises several narrow, parallel conveyor belts 1' instead of one broad conveyor belt. The conveyor belts 1' are guided over rolls 2, 2' and the first conveyor has as in the first embodiment a bend at the knife 10.

The first conveyor 16 transports after the knife 10 the cut skin and fat layer away.

The knife 10 is of the same kind as in the first embodiment.

From FIG. 7 appears that the apparatus is double and processes two rows of fish 13. There are thus two sets of elements 6 functioning individually each in connection with its own row of fish, but in connection with the very same knife 10.

The apparatus is further provided with a second conveyor 17 to transport the fish or the fillets 13 after the skinning. Also this conveyor 17 comprises several narrow, parallel bands 17' guided over guide rolls 17", of which one is driven.

FIG. 8 shows in more detail the area where the skin and the fat layer are cut off. Thus, the box 3 is seen with the ceiling 4 and containing the elements 6 being pivotal around a shaft 7. A hole 18 is shown for connection of a vacuum source.

The blade 11 of the knife 10 has as seen in FIG. 3 a lower course where the cutting takes place. The lower course forms thus the active portion of the knife. Over this lower course, as seen in FIG. 8, a wedge-shaped guide element 19 is arranged to guide the fish or the fillets up on the second conveyor 17.

The conveyor 17 is via a belt 20 running over one of the guide rolls 17" of the conveyor in driving connection with a wheel 21 which again is in driving engagement via a second belt 22 with a press roll 23 (these parts are not shown in FIG. 7). As seen, the first belt 20 crosses itself, the conveyor 17 and the press roll 23 having opposite rotating directions. During operation, the press roll 23 will engage with the top side of the fish or the fillets in order to help them passing the knife up along the top side of the guide element 19 and upon the second conveyor.

The press roll 23 is suspended such that it has a certain mobility around the rotational axis of the wheel 21 as shown by the double arrow 24. It can thus adapt to the actual thickness of the fish or fillet and provide a suitable pressure against this, either by means of its own weight or by means of springs, plumbs, levers etc.

The elements 6 in the box 3 are in this preferred embodiment adjusted by means of a cam cylinder 25. This has in different cross sections various profiles as shown in FIGS. 9 and 10. The cam cylinder 25 is pivotal around an axis 26.

FIG. 8 shows two of the elements 6: a centre element 6' and an element 6" arranged behind in the figure. The centre element 6' is in a lowered position, as it is supported by the cam cylinder 25 at the deep portion of a recess 27 in the cam cylinder 25. The second element 6" is on the other hand supported by the portion of the cam cylinder 25 placed outside the recess 27. By turning the cam cylinder 25 such that the section X—X is made to occupy the place which the section IX—IX occupies in FIG. 8, all elements 6 will be raised to the position of the second element and the cutting profile will be rectilinear. By turning the cam cylinder between the two said positions, the profiles 14a–14g shown in FIG. 1 are provided.

Instead of the pillars 8, the shaft 7 can be supported by the end walls of the box 3. The cam cylinder has an axle defining the position of the axis 26, which axle is passed through the end wall of the box 3 and outside the box is provided with means for handling.

The use of a cam cylinder 25 for adjustment of elements 6 permits to obtain a gearing between the movement of the cam cylinder and the adjustment of the cutting profile. Alternatively, the elements may be replaced by a cam cylinder which would immediately at its surface form a guide face for the conveyor belt 1 or the conveyor belts 1'.

As in the first embodiment, a vacuum in the box 3 will retain the fish and the conveyor belts 1' against the elements 6 and assure that the adjusted cutting profile is followed. The press roll 23 can also be instrumental in obtaining this, in particular is if it is placed a little upstream of the position shown in FIG. 8 (i.e. a little longer to the left in FIG. 8) such that it presses the fish before reaching the knife blade 11.

Even though the apparatus described above are meant for skinning fish, they may also be used for removal of the fat layer 14 from a fish where the skin is already removed. It is thus possible by an apparatus according to the invention to extract the fat layer 14 as a separate product.

The invention claimed is:

1. A method for use by an operator for skinning a piece of fish having skin on a side of fish meat, comprising the steps of:

placing the piece of fish on a supporting surface with said skin retained against said supporting surface;

conveying said piece of fish towards a knife with an active portion;

separating a major part of the fish meat from said skin by said active portion of said knife when said major part of the fish meat is conveyed over said active portion;

wherein a recess in the supporting surface is adjustable by the operator so that a varying cutting profile is provided across the direction of feed to produce larger or smaller quantities of said fish meat during separation of said fish meat from said skin; and wherein said cutting profile is modified by the operator during the skinning.

2. A method according to claim 1, wherein the fish is sucked against the supporting surface.

3. A method according to claim 1, wherein the fish is pressed against the supporting surface.

\* \* \* \* \*